Dec. 30, 1969   G. E. SANDERS   3,486,671
LITTER BACK PACK ASSEMBLY
Filed Dec. 4, 1967   2 Sheets-Sheet 2
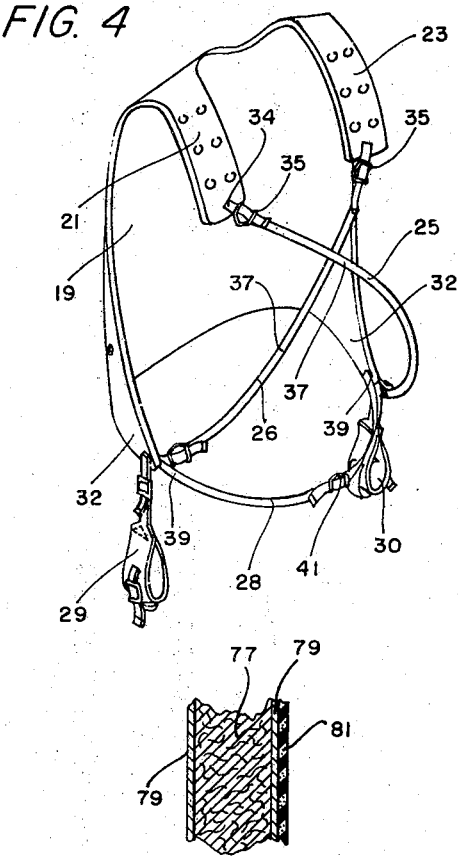
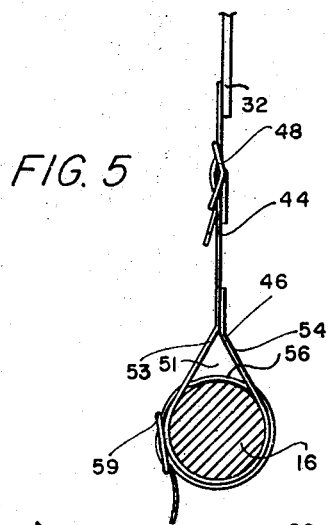
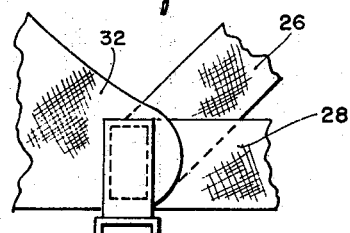
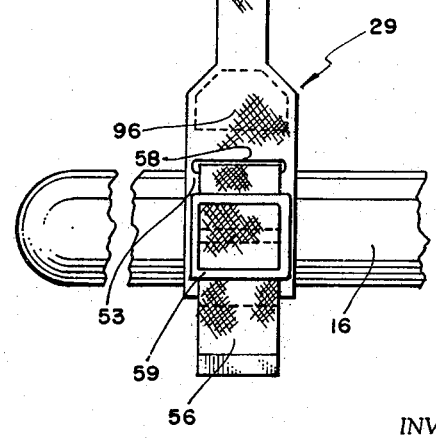
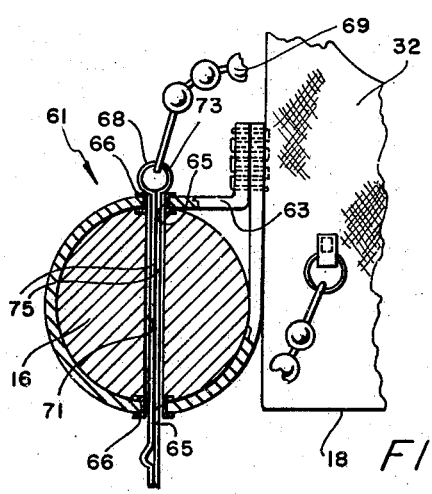
INVENTOR.
GROVER E. SANDERS
BY
*John H. Widdowson*
*Phillip A. Bein*
ATTORNEYS 3,486,671
LITTER BACK PACK ASSEMBLY
Grover E. Sanders, 2010 E. 50th St. S.,
Wichita, Kans. 67216
Filed Dec. 4, 1967, Ser. No. 687,888
Int. Cl. A61g *1/06;* A45f *3/14*
U.S. Cl. 224—6            5 Claims

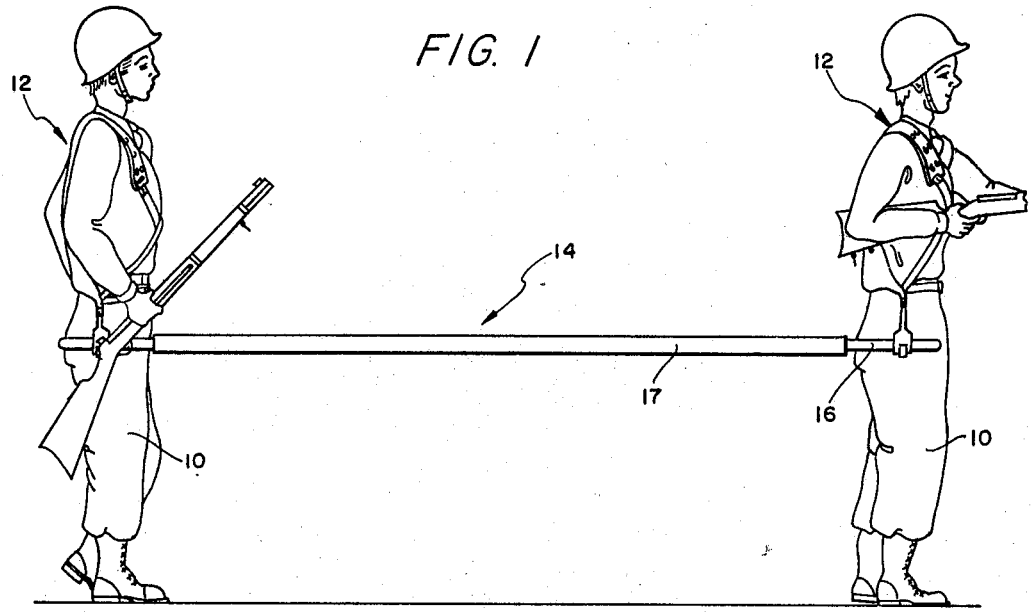
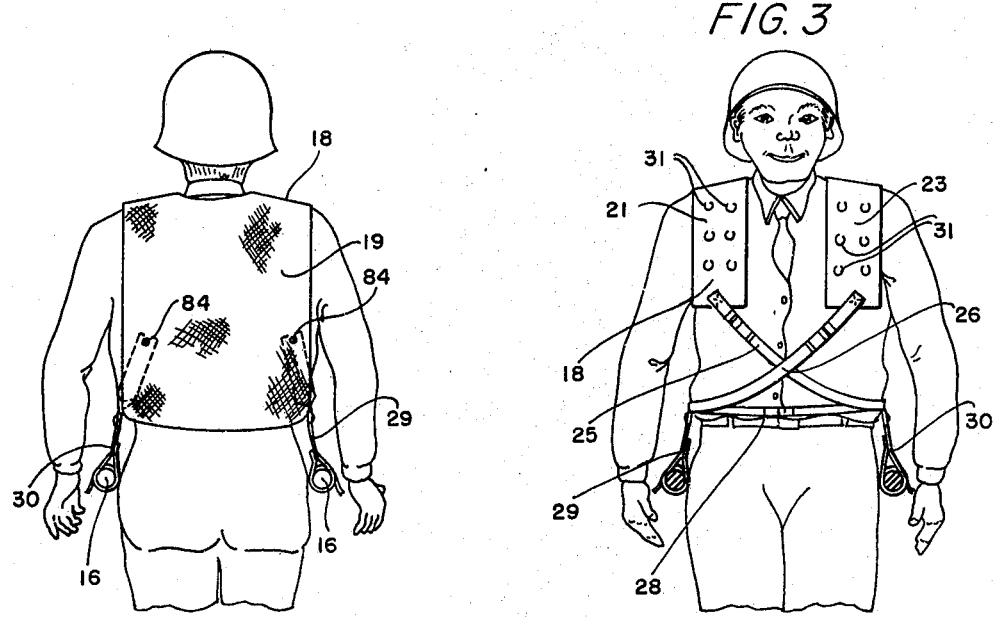

ABSTRACT OF THE DISCLOSURE

This invention relates to a means for transporting one end of a litter with a load thereon, and, more particularly, to a litter back pack assembly mountable on one's body and connectable to one end of an elongated litter for easily and safely transporting the same with a combat casualty thereon. More specifically, this invention relates to a litter back pack assembly including a vest-type main body section secured to the upper extremities of one's body by a plurality of strap members and having downwardly depending connector straps releasably connected to outer ends of support poles on a litter whereupon the litter may be carried by two persons, each wearing the litter back pack assembly of this invention leaving their hands free for other purposes as necessary in combat operations.

---

Numerous types of litter structures are known to the prior art having a patient supporting main body connected to longitudinally extended, parallel support poles whereupon the litter is carried by persons grasping the support poles at opposite ends thereof. However, nothing has been noted in the prior art permitting the persons carrying opposite ends of the litter to do the same in an easy manner while holding the patient in a generally horizontal position and allowing the litter carriers to have both hands free for combat operations. This is extremely desirable under combat conditions whereupon the persons carrying the litter may be fired upon at will if they are in a defenseless type position.

In one preferred embodiment of the litter back pack assembly of this invention, a vest-type main body is provided including a back section integral with front support sections adapted to be placed, respectively, over one's shoulder and interconnected as by anchor straps. Additionally, the back pack assembly is provided with a belt-type connector member to secure adjacent lower portions of the back sections to each other and downwardly depending connector strap assemblies on opposed sides of the back section. The connector strap assemblies are provided with loop sections connected to grasping straps engagable with the respective support poles of the litter. The grasping straps are adjustable vertically so as to place the litter at the upper height whereupon the uses of the litter back pack assemblies have free arm usage for carrying armed weapons or the like. Additionally, the position of the litter can be adjusted for variation between height of the litter carriers and to compensate for one's walking and running ability with the litter attached thereto. The vest-type body is constructed of a bullet-proof material so as to provide protection during usage and can be removed to provide a valuable shield against the enemy in case the wearer is caught in an open position. All of the grasp, connector, and anchor straps of this invention are provided with buckle-type structures without mating metal surfaces so as to be completely noiseless which must be achieved. Additionally, the connector strap assemblies are movable upwardly to a non-usage position and connected as by snaps to the back section so as to not hinder the wearer when not carrying a litter.

One object of this invention is to provide a means for carrying a litter overcoming the above-mentioned disadvantages of the prior art structures.

A further object of this invention is to provide a litter back pack assembly readily mounted upon a litter carrier in a comfortable manner and provided with downwardly depending connector strap assemblies attachable to the support poles of a conventional litter for raising and carrying one end of the same.

One other object of this invention is to provide a litter back pack assembly including a main body and upper front support sections having downwardly, depending litter connector strap assemblies whereupon the weight from the litter is readily carried in a downwardly manner upon the litter carrier's shoulders making the same easy to carry without the conventional fatigue.

A still further object of this invention is to provide a litter back pack assembly that is light-weight and substantially bullet-proof in construction; easy to attach and adjust so as to be worn in a comfortable manner; usable under combat conditions by not having noise producing structures thereon; and providing safety and reliability in carrying casualties from a combat zone.

Various other objects, advantages, and features of the invention will become apparent to those skilled in the art from the following discussion, taken in conjunction with the accompanied drawings, in which:

FIG. 1 is an elevational view of the litter back pack assemblies of this invention illustrated as mounted on a pair of combat soldiers carrying a litter therebetween;

FIG. 2 is a rear elevational view of the litter back pack assembly of this invention as mounted on a soldier;

FIG. 3 is a front elevational view of the litter back pack assembly similar to FIG. 2;

FIG. 4 is a perspective view of the litter back pack assembly of this invention;

FIG. 5 is an enlarged fragmentary sectional view taken to show in detailed preferred connector means to receive the litter handles;

FIG. 6 is an enlarged fragmentary side elevational view of a connector strap assembly means of the litter back pack assembly of this invention;

FIG. 7 is a fragmentary sectional view of a main body of the litter back pack assembly showing the bullet-proof construction thereof; and FIG. 8 is an enlarged fragmentary sectional view similar to FIG. 5 showing a second embodiment of a connector strap assembly of the litter back pack assembly of this invention.

The following is a discussion and description of preferred specific embodiments of the new litter back pack assembly of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a pair of combat soldiers 10 are illustrated as each having the litter back pack assembly 12 of this invention mounted thereon operable to connect and carry a litter 14 therebetween. The litter 14 is provided with a pair of longitudinally extended parallel support poles 16 interconnected by a support canvas body 17 whereupon the canvas body 17 is adapted to support a patient thereon. A plurality of anchor straps (not shown) may be provided for holding a casualty patient thereon, and it is obvious that various embodiments of litter structures could be used with the litter back pack assemblies 12 of this invention which only needs to be connected to longitudinally extended support poles 16.

As shown in FIGS. 2–4, inclusive, the litter back pack assembly 12 of this invention is provided with a main vest-type body 18 having a back section 19 integral with opposed, parallel shoulder or front support sections 21 and 23 interconnected as by anchor straps 25 and 26 and a main belt member 28, and having downwardly depending connector strap assemblies 29 and 30 connectable to the litter 14 as will be explained.

The vest-type main body 18 has the back section 19 of a generally rectangular shape adapted to extend substantially from the wearer's arms horizontally and from the upper shoulder portions down to an area adjacent the wearer's waist for reasons to become obvious. The parallel shoulder sections 21 and 23 are adapted to be placed upon opposite sides of one's head extended downwardly to cover a substantial front portion of the wearer for protective purposes. A plurality of spaced ring members 31 on the shoulder sections 21 and 23 are adapted to receive a plurality of hand grenades (not shown) necessary in combat conditions.

As shown in FIG. 4 the anchor straps 25 and 26 are connected to the shoulder sections 21 and 23 and additionally to lower, frontal, tapered sections 32 of the back section 19. The anchor straps 25 and 26 are each provided with connector tabs 34 having a buckle 35 mounted thereon with a main strap 37 connected therebetween from the shoulder sections 21 and 23 to one of the tapered sections 32. It is obvious that the anchor straps 25 and 26 are adjustable as desired to provide the proper fitness to the wearer and are crossed to keep the same from slipping off one's shoulder. The belt member 28 is of a substantially conventional securing structure having end portions 39 also connected to the frontal, tapered sections 32 and interconnected as by a buckle member 41. It is obvious that the belt member 28 can also be adjusted as desired.

As shown in FIGS. 5 and 6 the connector strap assemblies 29 and 30 are each provided with loop sections 44 connected to respective ones of the tapered frontal sections 32 and to grasping straps 46. Each loop section 44 includes a buckle member 48 secured to the tapered sections 32 and attached to the grasping straps 46. The grasping straps 46 are of loop-type structures having openings 51 between opposite side members 53 and 54. Anchor belts 56 are provided with portions extended through slots 58 in the opposite side members 53 and 54 and anchored as by buckles 59. As shown in FIG. 6 it is obvious respective support poles 16 of the litter 14 are extendable through the openings 51 and the anchor belts 56. It is obvious that the belts 56 may be tightened to present the structure of FIG. 5 and prevent axial movement of the respective support poles 16.

As shown in FIG. 8 a second embodiment of a connector strap assembly 61 is provided whereupon a loop member 63 is secured to each of the tapered forward sections 32 as by stitching or the like. The loop member 63 is provided with vertically aligned upper and lower openings 65, each reinforced as by grommets 66 to provide strength thereto. Each assembly 61 is provided with an anchor pin member 68 connected by a chain 69 to the body 18 in a conventional manner. In this embodiment, the end portions of the support poles 16 of the litter 14 must be provided with vertical openings 71 adapted to receive the pin members 68 (FIG. 8). Each anchor pin member 68 is provided with an upper ring 73 having integral downwardly diverging leg members 75. It is obvious that the loop members 63 may be constructed of a suitable plastic material or treated canvas to make the same rigid to hold the shape as shown in FIG. 8.

As shown in FIG. 7 the main body 18 is of a bullet-proof construction having a main fiberglass section 77 covered on opposite sides with insulating nylon material 79. A layer of woven metal 81 provides the bullet-proof construction and other types of bullet-proof materials could be used.

In the use and operation of the litter back pack assemblies 12, it is obvious that the same may be mounted on a combat soldier or the like in a manner as shown in FIG. 3 with the anchor straps 25 and 26 and belt member 28 tightened to achieve a form fit on the carrier's body. On connecting to the litter 14, the soldier may kneel between the parallel support poles 16 and thereupon insert the same within the grasping straps 46 for securing by the anchor belts 56 as shown in FIGS. 5 and 6. If desired, while in the kneeling position, the soldier may lower the connector strap assemblies 29 and 30 for ease of attachment and raising himself to the standing position of FIG. 1, the litter 14 can thereupon be raised as desired through the loop sections 44. It is seen that the adjustable features of the litter back pack assemblies 12 are desirable so as to fit persons of various heights and stature so that the litter 14 may be placed in a proper horizontal position without interfering with the person wearing same.

As shown in FIG. 2 the back section 19 is provided with snap-type buttons 84 whereupon the connector strap assemblies 29 and 30 can be moved to the position and secured to the buttons 84 as shown in dotted lines in FIG. 2 when in the non-usage position. This is desirable so that the conector strap assemblies will not conflict with the wearer's activities when not used to carry a litter.

As will be apparent in the foregoing description of the applicant's litter back pack assemblies, relatively inexpensive means have been provided readily attachable to the user and to parallel support poles of a conventional litter structure. This invention results in a means for carrying a litter which distributes the load to the user's shoulders and frees his hands for usage in combat as is frequently desirable. The litter back pack is generally light-weight, constructed of bullet-proof material, easy to put on and take off, and is readily adjustable to fit all sizes of persons.

I claim:

1. A litter carrier apparatus adapted to be mounted on a person and connectable to a litter having handle poles for carrying same, comprising:
    (a) a vest-type body means with integral shoulder sections mountable on the person with said shoulder sections placed over the upper chest portion of the person, said vest-type body means having a back section having a main body portion with lower side portions;
    (b) means connected to said body means for securing the same to the person, comprising anchor straps operably connected to respective ones of said shoulder sections and said lower side portions of said body means whereby the load carried by said apparatus is directed downward on the person's shoulders for ease and convenience;
    (c) a belt member secured to said lower side portions of said body means and extendedly across the front waist portion of the person using same to rigidly secure said body means thereto; and
    (d) connector means secured to said body means at said lower side portions of said back section adapted to attach the handle poles thereto for conveyance of the litter.

2. A litter carrier apparatus as described in claim 1, wherein:
    (a) said connector means having a connector strap assembly secured to opposite sides of said body means;
    (b) said connector strap assemblies including loop sections connected to said body means, grasping straps connected to said loop sections, and anchor straps engageable with the handle poles of the litter; and
    (c) said anchor straps extended through openings in said grasping strap releasably engageable with the handle poles in a clamped relationship whereby said poles are secured against axial movement.

3. A litter carrier apparatus as described in claim 2, wherein:
    (a) said loop sections having buckle members attachable to said body means and elongated adjustable strap members connected to said buckle members and said grasping straps whereby the vertical position of said grasping straps could be readily adjusted to compensate for various sizes in persons for proper placement of the handle poles of the litter during conveyance.

4. A litter carrier apparatus as described in claim 1, wherein:
   (a) said connector means having connector strap assemblies each including a loop member secured to said body means and a pin assembly engageable with said loop member and attachable to said body means;
   (b) said loop member having vertically aligned openings therein adapted to receive said pin assembly; and
   (c) said pin assemblies having chain members secured to said body means and anchor pins to be inserted through said aligned openings in said loop members and through diametrical holes in the handle poles of the litter for anchoring the same thereto.

5. A litter carrier apparatus as described in claim 1, wherein said back section and said shoulder sections constructed of a layer of fiberglass material having layers of nylon on opposite sides thereof, and a layer of bullet-proof material attached to one of said nylon layers thereby providing protection to the person wearing the same.

References Cited

UNITED STATES PATENTS

| | | | |
|---|---|---|---|
| 2,060,751 | 11/1936 | Baxter | 224—5 |
| 3,074,074 | 1/1963 | Lovering | 224—5 X |
| 3,258,788 | 7/1966 | Anciaux | 224—5 X |

GERALD M. FORLENZA, Primary Examiner

U.S. Cl. X.R.

5—82; 224—5